United States Patent [19] [11] 4,018,742
Suzuki et al. [45] Apr. 19, 1977

[54] IMIDE-RING CONTAINING POLYESTER AND WIRE ENAMEL CONTAINING SAME

[75] Inventors: Yasuhiro Suzuki; Katsuhiko Yamaguchi, both of Ibaraki, Japan

[73] Assignee: Nitto Electric Industrial Co., Ltd., Ibaraki, Japan

[22] Filed: Apr. 18, 1975

[21] Appl. No.: 569,430

[30] Foreign Application Priority Data

May 1, 1974 Japan .............................. 49-48279

[52] U.S. Cl. .......................... 260/75 N; 260/18 R; 260/33.4 R; 260/830 R; 260/857 PE; 260/838; 260/858
[51] Int. Cl.² ...................................... C08G 73/16
[58] Field of Search .......... 260/75 N, 33.4 R, 18 R, 260/857 E, 830 R, 838, 858

[56] References Cited
UNITED STATES PATENTS

| | | | |
|---|---|---|---|
| 2,448,767 | 9/1948 | Carlson | 260/47 EP |
| 2,594,145 | 4/1952 | Flory | 260/75 N |
| 3,555,113 | 1/1971 | Sattler | 260/75 N |
| 3,620,996 | 11/1971 | Matsumura et al. | 260/75 N |

FOREIGN PATENTS OR APPLICATIONS

| | | | |
|---|---|---|---|
| 1,450,704 | 7/1966 | France | 260/75 N |
| 1,445,263 | 7/1971 | Germany | 260/75 N |
| 1,203,599 | 8/1970 | United Kingdom | 260/75 N |

Primary Examiner—Eugene C. Rzucidlo
Attorney, Agent, or Firm—Sughrue, Rothwell, Mion, Zinn & Macpeak

[57] ABSTRACT

A polyester having imide rings in the molecule comprising the reaction product of (1) a polyhydric alcohol component comprising an imide ring containing diol represented by the formula (I)

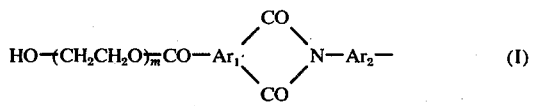
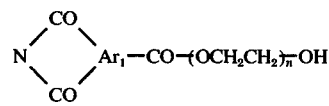

wherein $Ar_1$ represents a trivalent aromatic group; $Ar_2$ represents a divalent aromatic group; and $m$ and $n$ each represents an integer of 1 to 6; with the diol comprising the reaction product of 2 moles of an aromatic tricarboxylic acid anhydride of the formula (II)

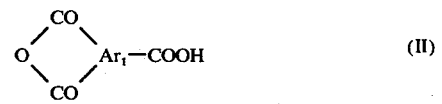

wherein $Ar_1$ has the same meaning as above, with 1 mole of a diamine of the formula (III)

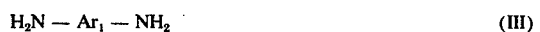

wherein $Ar_2$ has the same meaning as above, in the presence of ethylene carbonate; with (2) a polycarboxylic acid component comprising at least one of a polycarboxylic acid and a lower alkyl ester thereof; and a wire enamel containing at least one polyester having imide rings in the molecule as described above.

21 Claims, No Drawings

4,018,742

IMIDE-RING CONTAINING POLYESTER AND WIRE ENAMEL CONTAINING SAME

BACKGROUND OF THE INVENTION

1. FIELD OF THE INVENTION

This invention relates to wire enamels and components thereof, and more particularly to an imide-ring containing polyester, and wire enamels containing at least one polyester containing imide rings in the molecule.

2. DESCRIPTION OF THE PRIOR ART

The so-called polyester imide resins prepared by the introduction of imide rings into the polyester molecule have various excellent properties such as thermal life properties, heat shock resistance, solvent resistance, chemical resistance and super-charge resistance, and these resins recently have become extremely useful for wire enamels. In general, polyester imide resins are prepared as follows. A so-called imide ring containing carboxylic acid having terminal carboxylic groups such as ditrimellitic-imide acid is prepared by reaction of a tricarboxylic acid anhydride (a typical example of which is trimellitic anhydride) or a functional derivative thereof with a diamine. The resulting carboxylic acid is used as an acid component and is reacted with a polyhydric alcohol to form a polymer containing ester bonds. In this connection, polycarboxylic acids themselves containing imide rings in the molecule have extremely high melting points, and are insoluble in common solvents such as phenol, cresol and xylenol, and therefore, the synthesis of these polycarboxylic acids involves various disadvantages. For example, ditrimellitic-imide acid obtained by reaction of trimellitic anhydride wth diaminodiphenylmethane has a melting point of 360° C or more, and therefore, when this imide acid is used as a part or all of the acid component and subjected to an esterification reaction, the reaction system is not uniform in the initial stages of the reaction. This results in the necessity for a relatively longer period of time as compared with a conventional esterification reaction. This becomes even more evident with increased degree of imidemodification. In addition, when starting materials having such high melting points are used, the reaction must be carried out very often in the presence of solvents, so as to improve the ability to stir the system during the reaction. However, in a reaction carried out at a relatively high temperature such as an esterification reaction, solution polymerization is preferably avoided if possible, conddiering the boiling point of the solvent and the possiblity of interaction between the solvent and the monomer or polymer at high temperatures.

On the other hand, imide-modification improves the heat resistance of polyester resins with more improvement in the heat resistance being obtained as the degree of imidemodification increases, but, at the same time, an increase in the melting point of the polymers results as the degree of imidemodification increases. Accordingly, the modification degree is naturally limited from the standpoint of the ease of the production of the polymers and of the optimum viscosity thereof as wire enamels. From the stanpoint of conservation of resources the amount of solvent used in wire enamels should be as low as possible and to accomplish this the active ingredient in the wire enamel should be increased as much as possible and yet the viscosity of the wire enamel should be controlled to a viscosity which is suitable for common operations. In fact, from the viewpoint of electrical insulation, the active indgedient in wire enamel is not the solvent but resin component. In addition, the use of as small an amount of solvent as possible is advantageous in preventing environmental pollution. Thus, it is evident that the ideal situation would be operation in the absence of a solvent.

SUMMARY OF THE INVENTION

This invention in one aspect provides a polyester having imide rings in the molecule comprising the reaction product of (1) a polyhydric alcohol component comprising an imide ring containing diol represented by the formula (I)

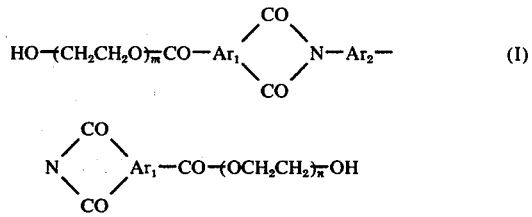

wherein $Ar_1$ represents a trivalent aromatic group; $Ar_2$ represents a divalent aromatic group; and $m$ and $n$ each represents an integer of 1 to 6; with the diol comprising the reaction product of 2 moles of an aromatic tricarboxylic acid anhydride of the formula

wherein $Ar_1$ has the same meaning as above, with 1 mole of a diamine of the formula (III)

wherein $Ar_2$ has the same meaning as above, in the presence of ethylene carbonate; with (2) a polycarboxylic acid component comprising at least one of a polycarboxyl acid and a lower alkyl ester thereof; and in a second aspect provides a wire enamel containing at least one polyester having imide rings in the molecule as described above.

DETAILED DESCRIPTION OF THE INVENTION

In the present invention, a characteristic feature in the introduction of imide rings into the polyester molecule resides in the production of an imide ring containing intermediate having terminal carboxyl groups in the presence of ethylene carbonate, followed by decarboxylation of the imide ring containing carcoxylic acid with ethylene carbonate to convert the termical carboxyl groups to terminal alcohol groups and the subsequent reaction of this product containing terminal hydroxyl groups with a polycarboxylic acid or a lower alkyl ester thereof to form an ester linkage. Ethylene carbonate has the ability to react with various kinds of compounds having an active hydrogen, and therefore, ethylene carbonate has the ability to react with an aromatic amino group. However, the reaction of ethylene carbonate with an aromatic amino group occurs at about 109° to 200° C, and so, while not desiring to be bound, it is believed that, the reaction in the presence of the acid anhydride group, the carboxyl group, the amino group and ethylene carbonate, the reaction of the amino group and the acid anhydride group first occurs to form an amide acid, followed by a subsequent ring closure of the amide acid to form an imide and a final esterification reaction of the carboxylic group with ethylene carbonate. The thus obtained imide ring containing diol has an extremely low melting point in comparison with imide ring containing carboxylic acids, and is a viscous liquid. Therefore, the subsequent polycondensation reaction therewith can proceed extremely smoothly.

In the present invention, the use of ethylene carbonate in the synthesis of imide ring containing diols is very important, and the amount of ethylene carbonate to be used can optionally be selected. More precisely, when n equivalents of ethylene carbonate are used for each carboxyl group of an imide ring containing carboxylic acid, an alcohol containing an ester linkage and whether linkages is formed as shown in the following reaction schematic:

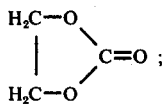

The melting point of the obtained imide ring containing diol decreases as the value of n increases. In general, n usually ranges from 1 to 6, preferably 2 to 4, from a practical standpoint. Thus, the melting point of the imide ring containing diol can be optionally adjusted by cntrolling the amount of ethylene carbonate, whic is a characteristic feature of this invention.

Although the formation of an ester linkage by reaction of ethylene carbonate and a carboxylic acid is known, this invention provides, as described above, an extremely significant industrial technique in the ability to obtain a reaction which proceeds smoothly and to adjust the characteristics of resins as wire enamels by varying the melting point of products.

Aromatic tricarboxylic acid anhydrides are represented by the following general formaula (II)

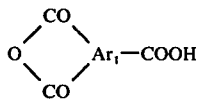

wherein $Ar_1$ represents a trivalent aromatic group having 6 or more carbon atoms, with two bonds of the three bonds of $Ar_1$ being positioned adjacent each other. More specifically, $Ar_1$ can be selected from the group consisting of

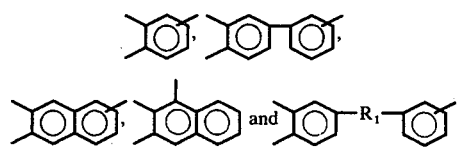

$R_1$ represents —$CH_2$—, —O—, —S—, —$SO_2$—, —CO— or

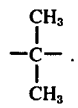

Typical examples of these acid anhydrides are trimellitic anhydride, hemimellitic anhydride, 3,4,3' (or 3,4,4,')-diphenyltricarboxylic anhydride, 3,4,3' (or 3,4,4')-diphenylmethanetricarboxylic anhydride, 3,4,3' (or 3,4,4')-diphenylethertricarboxylic anhydride, 3,4,3' (or 3,4,4')-diphenylsulfidetricarboxylic anhydride, 3,4,3' (or 3,4,4')-diphenylsulfonetricarboxylic anhydride, 3,4,3' (or 3,4,4')-diphenylketonetricarboxylic anhydride, 3,4,3' (or 3,4,4')-diphenylpropanetricarboxylic anhydride, 2,3,6 (or 2,3,5 or 1,2,4)-naphthalenetricarboxylic anhydride, etc., and a mixture thereof.

As an organic diamine which can be used in this invention, a diamine compound having the general formula (III)

$$H_2N — Ar_2 — NH_2 \qquad (III)$$

wherein $Ar_2$ represents a divalent aromatic group, is suitable. More specifically, $Ar_2$ can be selected from the group consisting of

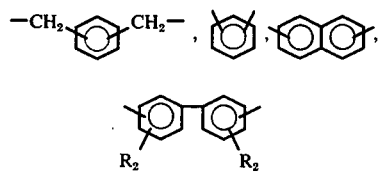

wherein $R_2$ represents —H, —Cl, —Br, —$OCH_3$, —$CH_3$ or —$C_2H_5$, and

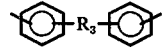

wherein $R_3$ represents —$CH_2$—, —O—, —S—, —$SO_2$—, —CO—,

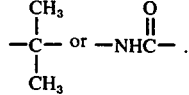

Typical examples of these diamine compounds are m-xylylenediamine, p-xylylenediamine, ,-phenylenediamine, p-phenylenediamine, benzidine, 3,3'-dimethoxybenzide, 3,3'-dichlorobenzidine, 3,3'-dimethylbenzidine, 1,5—diaminonaphthalene, 2,6,-diaminonaphthalene, 4,4'-diaminodiphenylmethane, 4,4' (or 3,4')-diaminodiphenylether, 4,4'-diaminodiphenylsulfide, 3,3' (or 4,4')-diaminodiphenylsulfone, 4,4'-diaminodiphenylketone, 4,4'-diaminodiphenylpropane, 3,4'-diaminobenzanilide, etc., and a mixture thereof. Aliphatic diamines and alicyclic diamines must be avoided since these tend to easily react with ethylene carbonate at a relatively low temperature.

In the preparation of an imide ring containing diol in the present invention, the tricarboxylic acid anhydride, the diamine and the ethylene carbonate are present together and these materials are reacted at a reaction temperature ranging, in general, from about room temperature (e.g., 20° to 30° C) to 250° C, preferably from 80° to 230° C, for about 1 to 6 hours. A suitable molar proportion of the tricarboxylic acid anhydride and the diamine is about 2:1 with the amount of ethylene carbonate being about $n$ equivalents. In this reaction, the reaction temperature must necessarily be increased step by step. More precisely, in the initial stage, the reaction is carried out for a specific period of time, e.g., for about 30 minutes to 3 hours, at 80° to 150° C for completion of the formation of an amide acid and/or imide ring from the amino group and the acid anhydride group, and then the reaction temperature is gradually increased so that the reaction of the carboxylic acid and the ethylene carbonate progresses. When the amount of ethylene carbonate is equivalent to the amount of carboxyl group to be reacted therewith, the reaction system becomes a paste or a solid at one time in some cases in the formation of the amide acid. However, after the reaction temperature is increased further, a decarboxylation reaction occurs following a dehydration reaction accompanied by an imidation, and the reaction system changes to a transparent molten condition as the reaction progresses at 220° to 230° C. If the amount of ethylene carbonate used is greater than the equivalent amount thereof, the melting point of the imide ring containing diol obtained decreases.

On the other hand, the aromatic tricarboxylic acid anhydride, the diamine and the ethylene carbonate can be reacted, for example, in a aprotic solvent not containing any active hydrogens to obtain an imide ring containing diol. Suitable aprotic solvents are dimethylformamide, dimethylacetamide, N-methyl-2-pyrrolidone, etc. A mixed solution of these substances and ethylene glycol dimethylether, ethylene glycol diethylether, ethylene glycol dibutylether or the like can also be employed as a solvent in this invention. A suitable amount of the solvent employed ranges from about 50 to 95% by weight, preferably 70 to 85% by weight. The resulting diol, after isolation, can be used in the following synthesis of the imide ring containing polyester. Otherwise, a dicarboxylic acid or a lower alkyl ester thereof such as terephthalic acid, isophthalic acid or a lower alkyl ester thereof can be incorporated previously in the synthesis of the imide ring containing diol. In particular, the previous addition of a polycarboxylic acid derivative having a relatively low melting point such as dimethylterephthalate is effective from the standpoint of facilitating the stirring of the reaction system.

The thus synthesized imide ring containing diol, as one component of the polyhydric alcohol component, is reacted in the next step with a polycarboxylic acid or a lower alkyl ester thereof, optionally together with other polyhydric alcohols, to prepare a desired resin for a wire enamel. In this reaction, suitable temperatures are those generally employed in the case of the production of conventional polyesters, i.e., about 180° to 250° C. The polyhydric alcohols which can be used along with the imide ring containing diol are, for example, di-, tri- and tetrahydric alcohols such as ethylene glycol, diethylene glycol, triethylene glycol, propylene glycol, dipropylene glycol, neopentyl glycol, glycerin, trimethyl propane, tris(2-hydroxyethyl)isocyanurate and pentaerythritol, and these polyhydric alcohols can be used singly or the form of a mixture.

Representative examples of polycarboxylic acids and the derivatives thereof are, for example, aromatic dicarboxylic acids and lower alkyl esters thereof such as isophthalic acid, terephthalic acid, 1,4 (or 1,5 or 2,6)-naphthalene dicarboxylic acid, dimethyl isophthalate, dimethyl terephthalate, diethyl isophthalate and diethyl terephthalate. A suitable amount of the imide ring containing diol in the alcohol component is about 5 to 80% by weight, preferably 30 to 60% by weight, to achieve the physical properties and characteristics of the resin desired. The suitable ratio of the alcohol component and the acid component to obtain the imide ring containing polyester desired can be represented by the following relationship.

—OH/—COOH molar ratio = about 1.2 to 1.6

The resins obtained according to the present invention have a relatively lower melting point, for example, the softening point thereof measured in accordance with the JIS K-2531 ring and ball test ranges from about 60°~120° C. In addition, the resins of the invention are quite soluble in phenol, cresol, xylenol or a mixture thereof with naphtha and therefore the solid content concentration therein can be further increased as compared with conventional polyester-imide resin enamels.

In addition, where the softening point of the resin is especially low, or in general, 70° to 80° C, the resin becomes a liquid after heating at 140° C without a solvent, similar in nature to conventional solvent containing enamels, and therefore, coating and baking of the resin without using a solvent is possible. When the thus obtained resin or resin solution is to be used as a wire enamel, various kinds of additives can be desirably used, as in the case of conventional enamels. Suitable additives which can be used are described below.

As a drier component, at least one of a metal (such as iron, manganese, cobalt, zinc and lead) naphthenate or octenoate can be added in an amount of about 0.1 to 2% by weight based on the resin solid contents, whereby the appearance of the resulting wire can be stabilized.

As a hardening agent, a titanium compound such as tetrapropyl titanate or tetrabutyl titanate can be added in an amount of about 1 to 5% by weight based on the resin solid contents, whereby the thermal, mechanical and chemical properties of the coated film can be improved.

Moreover, addition of a blocked polyisocyanate, a phenol-formaldehyde resin and/or an epoxy resin is effective. A suitable amount of these additional resins is about 0.5 to 10% by weight to the imide ring containing polyester.

The enamels of this invention can suitably be in the form of a solid or a solution.

In the present invention, the imide ring containing diols to be used for production of polyesters containing imide rings in the molecule can be prepared, for example, according to the following Preparation Examples A to C. Unless otherwise indicated herein, all parts, percents, ratios and the like are by weight.

PREPARATION EXAMPLE A

In a four neck flask (capacity: 500 ml) provided with a thermometer, a condenser with a trap and a stirrer were placed 70.4 g (0.8 mole) of ethylene carbonate and 79.2 g (0.4 mole) of diaminodiphenylmethane, and these materials were heated at 90° C. The reaction system became a transparent pale yellow solution. Next, 153.6 g (0.8 mole) of trimellitic anhydride was added thereto at the same temperature and the system was continuously stirred. While the temperature was being gradually increased, the trimellitic anhydride was dissolved little by little, and thereafter the reaction system became a paste and then subsequently a solid at 140° to 145° C. After the stirring was stopped and the heating was continued, the solid melted at about 220° C and the resulting melt could be stirred. Meanwhile, 13.7 g of water was distilled out. After the reaction was continued for about 30 minutes at 210° ~ 220° C, the reaction system become transparent. After the reaction was still continued for 30 minutes at the same temperature, the reaction product was removed from the flask while hot, cooled to room temperature (e.g., about 20° ~ 30° C) and then pulverized to a powder and stored. The acid value (represented by mg number of KOH equivalent per carboxyl group in 1 g of sample) of the product was 3.2.

PREPARATION EXAMPLE B

In a four neck flask (capacity: 500 ml) provided with a thermometer, a condenser with a trap and a stirrer were placed 140.8 g (1.6 moles) of ethylene carbonate and 79.2 g (0.4 mole) of diaminodiphenylmethane, and these materials were heated at 90° C. The reaction system became a transparent pale yellow solution. Next, 153.6 g (0.8 mole) of trimellitic anhydride was added at the same temperature and the system continuously stirred. After the temperature was gradually increased, the reaction system became a semi-solid at 140° ~145° C. After the heating was still ~ the reaction system changed to a transparent solution at about 200° C. Meanwhile, 11.6 g of water were distilled out. The reaction was further continued for about 2 hours at 210° ~ 220° C. Consequently, the total amount of water distilled out during the reaction was 14.1 g. The melt viscosity of the reaction system during the reaction was lower than that of the former Preparation Example A. The product was removed from the flask while hot, cooled to room temperature, and then pulverized to a powder and stored. The acid value of the product obtained was 1.6.

PREPARATION EXAMPLE C

In a four neck flask (capacity: 1 l) provided with a thermometer, a condenser with a trap and a stirrer were placed 211.2 g (2.4 moles) of ethylene carbonate and 80.0 g (0.4 mole) of diaminodiphenylether, and these materials were heated at 90° C. Next, 153.6 g (0.8 mole) of trimellitic anhydride was added thereto at the same temperature, and the temperature was gradually increased while the system was continuously stirred. The reaction system became a paste at 130° ~ 145° C, and after being continuously heated, the system became a transparent solution at about 200° C. The reaction was further continuously carried out for about 2 hours at 210° ~ 220° C, and consequently, the total amount of water distilled out during the reaction was 14.0 g. The melt viscosity of the reaction system during the reaction was far lower than that of the former Preparation Example B. The reaction system did not solidify even after cooling to room temperature, and still remained a viscous liquid. The acid value of the product was 1.9.

The present invention will be explained in greater detail by reference to the following Examples.

EXAMPLE 1

In a four neck flask (capacity: 1 l) provided with a thermometer, a condenser with a trap and a stirrer were placed 116 g of dimethyl terephthalate, 13 g of ethylene glycol, 33 g of glycerin and 133 g of imide ring containing diol prepared in Preparation Example A, and the mixture was heated at 150° C. After the reaction system became uniform, 0.23 g manganese acetate was added thereto. After reaction was carried out for 3 hours at 180° C, the reaction was still continued at 200° C for 3 hours and then at 230° C for 3 hours. The amount of methanol distilled out during the reaction was 34 g. Afterwards, the reaction was continuously carried out for 70 minutes under reduced pressure (degree of vacuum: 10 mmHg) at the same temperature. The resin obtained had a softening point of 98° C. The resin was dissolved by adding thereto 110 g of industrial cresol and 130 g of naphtha, and then, after 7.0 g of zinc octenoate was added to the resulting solution at 120° C, a solution of 7 g of tetrabutyl titanate dissolved in 20 g of cresol was added thereto while the temperature of the system was kept at 70° C. In addition, 25 g of industrial cresol and 25 g of naphtha were added and dissolved for the purpose of adjusting the viscosity of the resulting melt. The viscosity of the wire enamel thus obtained was 72 poise (at 30° C), and the non-volatile content thereof was 46.3% (weight: 1.5 g, after heating for 2 hours at 200° C). The enamel was baked on a copper wire (diameter: about 1 mm $\phi$) according to a conventional method and the appearance of the surface of the thus obtained wire was uniform and quite lustrous. The properties of the wire were good and were as shown in Table 1 below.

EXAMPLE 2

In a four neck flask (capacity: 1 l) provided with a thermometer, a condenser with a trap and a stirrer were placed 116 g of dimethyl terephthalate, 9 g of ethylene glycol, 33 g of glycerin and 152 g of the imide ring containing diol prepared in Preparation Example B, and these were reacted analogously to Example 1 prepared a resin. (0.23 g of manganese acetate was used.) The softening point of the thus prepared resin was 83° C. This resin was dissolved by adding thereto 100 g of industrial cresol and 120 g of naphtha, and then, after 7.3 g of zinc octenoate was added to the resulting solution at 120° C, a solution of 7.3 g of tetrabutyl titanate dissolved in 25 g of cresol was added thereto while the temperature of the system was kept at 70° C. The viscosity of the wire enamel obtained was 69 poise (at 20° C) and the non-volatile content thereof was 51.7% (weight: 1.5 g, after heated for 2 hours at 200° C). The enamel was baked on a copper wire (diameter: about 1 mm $\phi$) according to a conventional method and the appearance of the surface of the wire thus obtained was uniform and quite lustrous. The properties of the wire were good and are shown in Table 1 below.

EXAMPLE 3

In a four neck flask (capacity: 1 l) provided with a thermometer, a condenser with a trap and a stirrer were placed 116 g of dimethyl terephthalate, 7 g of ethylene glycol, 33 g of glycerin and 170 g of the imide ring containing diol obtained in Preparation Example C, and these were reacted analogously to Example 1 to prepare a resin. (0.23 g of zinc acetate was used.) The softening point of the thus obtained resin was 70° C or below. This resin was dissolved by adding thereto 40 g of industrial cresol and 50 g of naphtha, and then, after 7.7 g of cobalt octenoate was added to the system heated at 120° C and was fully admixed, a solution of 7 g of tetrabutyl titanate dissolved in 20 g of cresol was added thereto while the temperature of the system was kept at 70° C. The viscosity of the wire enamel thus obtained was 83 poise (30° C) and the non-volatile content thereof was 70.6% (weight: 1.5 g, after heating at 200° C for 2 hours). The enamel was baked on a copper wire (diameter: about 1mm $\phi$) according to a conventional method, and the appearance of the surface of the wire thus obtained was uniform and quite lustrous. The properties of the wire were good as shown in Table 1 below.

EXAMPLE 4

In a four neck flask (capacity: 500 ml) provided with a thermometer, a condenser with a trap and a stirrer were placed 44 g of ethylene carbonate, 39.6 g of diaminodiphenylmethane and 97 g of dimethyl terephthalate, and then 77.6 g of trimellitic anhydride was gradually added thereto while heating the system at 130° C. The reaction system was first a paste and uneven, and after the temperature thereof was increased, the system became a uniform solution at about 200° C. Afterwards, the reaction was carried out further for about 3 hours at 220° C. The amount of water distilled out during the reaction was 6 g. Next, the reaction temperature was decreased to 180° C, and 12 g of ethylene glycol, 78 g of tris(2-hydroxyethyl)isocyanurate and 0.19 g of manganese acetate was then added to the reaction system. After the reaction was carried out for 3 hours at 180° C, the reaction was further continued at 200° C for 3 hours and then at 230° C for 3 hours. The amount of methanol distilled out during the continued reaction was 29 g. Afterwards, the reaction was further carried out under reduced pressure (degree of vacuum: 10 mmHg) for one hour and a half at the same temperature. The softening point of the resin obtained was 84° C. After 2.8 g of zinc octenoate was added to the resulting resin at 120° C, a solution of 5 g of a resole type phenol-formaldehyde resin (m.p. 95° C) dissolved in 10 g of industrial cresol was added thereto at the same temperature of 120° C, and then the entire system was stirred for about 1 hour. Next, the system was cooled to 70° C, and a solution of 5.4 g of titanium methyl acetoacetate phenolate dissolved in 10 g of industrial cresol was added thereto. Afterwards, the reaction system was heated at 130° C and stirred for 2 hours. The viscosity of the wire enamel thus obtained was 62 poise (at 100° C) and the non-volatile content thereof was 94.1% (weight: 1.5 g, after heating for 2 hours at 200° C).

The resin thus obtained containing a high non-volatile content was placed in a varnish container which could be heated at a constant temperature, and was coated three times on a copper wire (diameter: about 1 mm $\phi$) while the temperature of the enamel was kept at 120° C. The enamel was then baked thereon under the following conditions: furnace temperature: 430° C; effective furnace length: 3 m; rate: 5.5 m/min. As a result thereof, a wire having a coated film of a thickness of 0.038 mm was obtained. The appearance of the wire was uniform and quite lustrous, and the properties thereof were good as shown in the Table 1 below.

TABLE 1

| | Wire Properties Example 1 | Example 2 | Example 3 | Example 4 |
|---|---|---|---|---|
| Baking Temperature | 430° C | 430° C | 430° C | 430° C |
| Rate | 6.0m/min | 6.0m/min | 6.0m/min | 5.5m/min |
| Coating Times | 6 times | 6 times | 6 times | 3 times |
| Diameter of Core Wire (mm) | 0.995 | 0.995 | 0.995 | 0.998 |
| Diameter of Finished Wire (mm) | 1.077 | 1.079 | 1.075 | 1.074 |
| Thickness of Film (mm) | 0.041 | 0.042 | 0.040 | 0.038 |
| Flexibility | | | | |
| (1d winding) | Good | Good | Good | Good |
| (1d winding after 20% elongation) | Good | Good | Good | Good |
| Abrasion Resistance (load 700 g) | 82 | 74 | 76 | 56 |
| Heat Shock Resistance (200° C × 1 hr) | 1d Good | 1d Good | 1d Good | 1d Good |
| Softening Point after Heating (load 2.1 kg, 2° C/min) | 347° C | 331° C | 353° C | 388° C |
| Winding Character after Deterioration (200° C × 24 hr) | 2d Good | 1d Good | 1d Good | 2d Good |
| Breakdown Voltage (two wires twisted) | 13.4kv | 12.8kv | 12.5kv | 9.7kv |
| Breakdown Voltage after Deterioration (deteriorated at 240° C for 168 hours) | 11.8kv | 11.9kv | 11.2kv | 9.4kv |
| Solvent Resistance (23° C × 24 hr)* | | | | |
| Benzole | 5H | 5H | 5H | 5H |
| Toluol/Ethanol = 3/7 | 5H | 5H | 5H | 5H |
| Chemical Resistance (23° C × 24 hr)* | | | | |
| H$_2$SO$_4$ (specific gravity: 1.2) | 5H | 5H | 5H | 5H |
| NaOH (3%) | 4H | 4H | 4H | 4H |

*pencil hardness

As explained above in detail, the present invention relates to novel imide-modified polyester wire enamels, and it is understood from the above explanation that, according to the present invention, the viscosity of the wire enamels can possibly be lowered due to the specific imide-modification which is different from conventional modifications, and further, resins having sufficient heat resistance can be obtained without the necessity for conducting a complicated reaction in the presence of solvents which give rise to difficulties. In addition, it is the result that the viscosity thereof can be lowered, and therefore, the wire enamel of this invention is effective as a so-called hot-melting type wire enamel because the melting point of the resin is low. A hot-melting type wire enamel is an enamel to be coated on a conductor while the resin which is solid at room temperature is heated and molten. When these high concentration enamels or hot-melting type enamels are actually utilized, consumption of solvent can be reduced, and these enamels are extremely industrially valuable from the standpoint of economization of natural resources. In addition, high concentration enamels and hot-melting type enamels require less energy for evaporation of solvent, as compared with conventional varnishes, and these enamels are also advantageous from the standpoint of energy consumption.

While the invention has been described in detail and with reference to specific embodiments thereof, it will be apparent to one skilled in the art that various changes and modifications can be made therein without departing from the spirit and scope thereof.

What is claimed is:

1. A polyester having imide rings in the molecule comprising the reaction product of
   1. a polyhydric alcohol component comprising about 5 to 80% by weight of an imide ring containing diol represented by the following Formula (I)

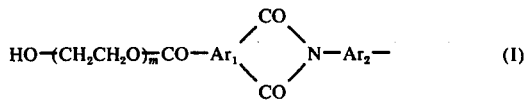

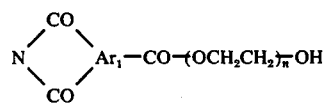

wherein $Ar_1$ represents a trivalent aromatic group; $Ar_2$ represents a divalent aromatic group; and m and n each represents an integer of 1 to 6; with the diol being the reaction product of 2 moles of an aromatic tricarboxylic acid anhydride of the following formula (II)

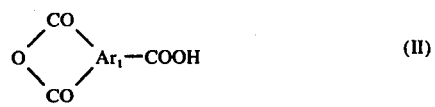

wherein $Ar_1$ has the same meaning as above; with 1 mole of a diamine of the following formula (III)

wherein $Ar_2$ has the same meaning as above, in the presence of ethylene carbonate; and;
   2. a polycarboxylic acid component comprising at least one of a polycarboxylic acid and a lower alkyl ester thereof;
wherein the ratio of the polyhydric alcohol component (1) to the polycarboxylic acid component (2), as expressed by the —OH/—COOH molar ratio, is about 1.2 to 1.6.

2. The polyester as claimed in claim 1, wherein $Ar_1$ is selected from the group consisting of

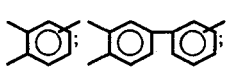

-continued

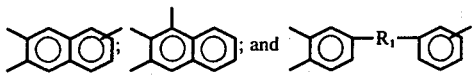

wherein $R_1$ represents —CH$_2$—, —O—, —S—, —SO$_2$—, —CO— or

3. The polyester as claimed in claim 1, wherein $Ar_2$ is selected from the group consisting of

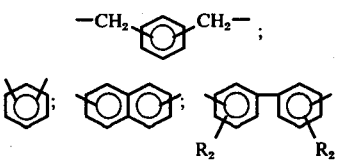

wherein $R_2$ represents —H, —Cl, —Br, —OCH$_3$, —CH$_3$ or —C$_2$H$_5$: and

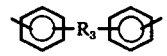

wherein $R_3$ represents —CH$_2$—, —O—, —S—, —SO$_2$—, —C0—,

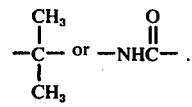

4. The polyester as claimed in claim 1, in which said aromatic tricarboxylic acid anhydride (II) is selected from the group consisting of trimellitic anhydride, hemimellitic anhydride, 3,4,3' (or 3,4,4')-diphenyltricarboxylic anhydride, 3,4,3' (or 3,4,4')-diphenylmethanetricarboxylic anhydride, 3,4,3' (or 3,4,4')-diphenylethertricarboxylic anhydride, 3,4,3' )-diphenylslfidetricarboxylic anhydride, 3,4,3' (or 3,4,4')-diphenylsulfonetricarboxylic anhydride, 3,4,3' (or 3,4,4')-diphenylketonetricarboxylic anhydride, 3,4,3' (or 3,4,4')-diphenylpropanetricarboxylic anhydride, 2,3,6 (or 2,3,5 or 1,2,4)-naphthalenetricarboxylic anhydride, and a mixture thereof.

5. The polyester as claimed in claim 1, in which said diamine (III) is selected from the group consisting of m-xylylenediamine, p-xylylenediamine, m-phenylenediamine, p-phenylenediamine, benzidine, 3,3'-dimethoxybenzidine, 3,3'-dichlorobenzidine, 3,3'-dimethylbenzidine, 1,5-diaminonaphthalene, 2,6-diaminonaphthalene, 4,4'-diaminodiphenylmethane, 4,4'(or 3,4')-diaminodiphenylether, 4,4'-diaminodiphenylsulfide, 3,3'(or 4,4')-diaminodiphenylsulfone, 4,4'-diaminodiphenylketone, 4,4'-diaminodiphenylpropane, 3,4'-diaminobenzanilide and a mixture thereof.

6. The polyester as claimed in claim 1, in which said polhydric alcohol component includes at least one polyhydric alcohol selected from the group consisting of ethylene glycol, diethylene glycol, triethylene glycol, propylene glycol, dipropylene glycol, neopentyl glycol, glycerin, trimethylol propane, tris(2-hydroxyethyl)isocyanurate and pentaerythritol.

7. The polyester as claimed in claim 1, in which said polycarboxylic acid and lower alkyl ester thereof are selected from the group consisting of isophthalic acid, terephthalic acid, 1,4-naphthalene dicarboxylic acid, 1,5-naphthalene dicarboxylic acid, 2,6-naphthalene dicarboxylic acid, dimethyl isophthalate, dimethyl terephthalate, diethyl isophthalate, and diethyl terephthalate.

8. A wire enamel containing a polyester having imide rings in the molecule comprising the reaction product of
1. a polyhydric alcohol component comprising about 5 to 80% by weight of an imide ring containing diol represented by the following formula (I)

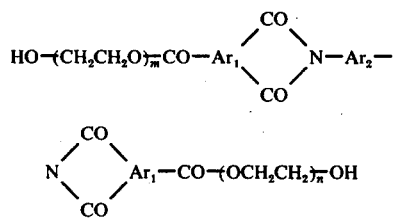 (I)

wherein Ar$_1$ represents a trivalent aromatic group; Ar$_2$ represents a divalent aromatic group; and m and n each represents an integer of 1 to 6; with the diol being the reaction product of 2 moles of an aromatic tricarboxylic acid anhydride of the following formula (II)

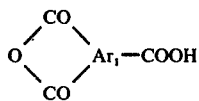 (II)

wherein Ar$_1$ has the same meaning as above; with 1 mole of a diamine of the following formula (III)

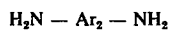 (III)

wherein Ar$_2$ has the same meaning as above, in the presence of ethylene carbonate; and 2. a polycarboxylic acid component comprising at least one of a polycarboxylic acid and a lower alkyl ester thereof wherein the ratio of the polyhydric alcohol component (1) to the polycarboxylic acid component (2), as expressed by the —OH-/—COOH molar ratio, is about 1.2 to 1.6.

9. The wire enamel as claimed in claim 8, wherein Ar$_1$ is selected from the group consisting of

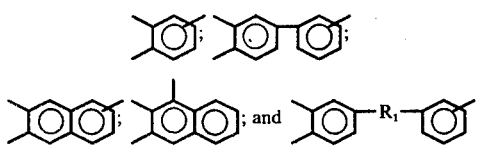

wherein R$_1$ represents —CH$_2$—, —O—, —S—, —SO$_2$—, —CO— or

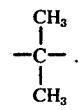

10. The wire enamel as claimed in claim 8, wherein Ar$_2$ is selected from the group consisting of

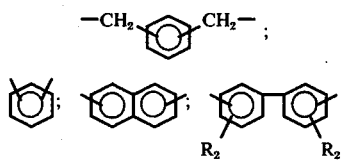

wherein R$_2$ represents —H, —Cl, —Br, —OCH$_3$, or —C$_2$H$_5$: and

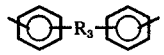

wherein R$_3$ represents —CH$_2$—, —O—, —S—, —SO$_2$—, —CO—,

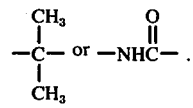

11. The wire enamel as claimed in claim 8, in which said aromatic tricarboxylic acid anhydride (II) is selected from the group consisting of trimellitic anhydride, hemimellitic anhydride, 3,4,3' (or 3,4,4')-diphenyltricarboxylic anhydride,
3,4,3' (or 3,4,4')-diphenylmethanetricarboxylic anhydride,
3,4,3' (or 3,4,4')-diphenylethertricarboxylic anhydride,
3,4,3' (or 3,4,4')-diphenylsulfidetricarboxylic anhydride,
3,4,3' (or 3,4,4')-diphenylsulfonetricarboxylic anhydride,
3,4,3' (or 3,4,4')-diphenylketonetricarboxylic anhydride,
3,4,3' (or 3,4,4')-diphenylpropanetricarboxylic anhydride,
2,3,6 (or 2,3,5 or 1,2,4)-naphthalenetricarboxylic anhydride, and a mixture thereof.

12. The wire enamel as claimed in claim 8, in which said diamine (III) is selected from the group consisting of m-xylylenediamine, p-xylylenediamine, m-phenylenediamine, p-phenylenediamine, benzidine, 3,3'-dimethoxybenzidine, 3,3'dichlorobenzidine, 3,3'-dimethylbenzidine, 1,5-diaminonaphthalene, 2,6-diaminonaphthalene, 4,4'-diaminodiphenylmethane, 4,4'(or 3,4')-diaminodiphenylether, 4,4'-diaminodiphenylsulfide, 3,3'-(or 4,4')-diaminodiphenylsulfone, 4,4'-diaminodiphenylketone, 4,4'-diaminodiphenylpropane, 3,4'-diaminobenzanilide and a mixture thereof.

13. The wire enamel as claimed in claim 8, in which said polyhydric alcohol component includes at least one polyhydric alcohol selected from the group consisting of ethylene glycol, diethylene glycol, triethylene glycol, propylene glycol, dipropylene glycol, neopentyl glycol, glycerin, trimethylol propane, tris(2-hydroxyethyl)isocyanurate and pentaerythritol.

14. The wire enamel as claimed in claim 8, in which said polycarboxylic acid and lower alkyl ester thereof are selected from the group consisting of isophthalic acid, terephthalic acid, 1,4-naphthalene dicarboxylic acid, 1,5-naphthalene dicarboxylic acid, 2,6-naphthalene dicarboxylic acid, dimethyl isophthalate, dimethyl terephthalate, diethyl isophthalate, and diethyl terephthalate.

15. The wire enamel as claimed in claim 8, including at least one of a drier component, a hardening agent, a blocked polyisocyanate, a phenol-formaldehyde resin and an epoxy resin.

16. The wire enamel as claimed in claim 15, in which said drier components is iron, manganese, cobalt, zinc or lead naphthenate or octenoate.

17. The wire enamel as claimed in claim 15, in which said hardening agent is tetrapropyl titanate or tetrabutyl titanate.

18. The polyester as claimed in claim 1, wherein said imide ring containing diol comprises 30 to 60% by weight of said polyhydric alcohol component.

19. The wire enamel as claimed in claim 8, wherein said imide ring containing diol comprises 30 to 60% by weight of said polyhydric alcohol component.

20. The polyester as claimed in claim 1, wherein m and/or n is 2 to 4.

21. The wire enamel as claimed in claim 8, wherein m and/or n is 2 to 4.

* * * * *